Oct. 14, 1941.    M. E. THOMPSON    2,259,359
POWER SAVER
Filed March 6, 1939
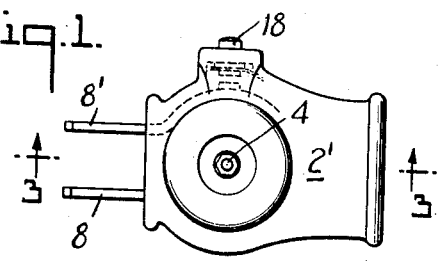
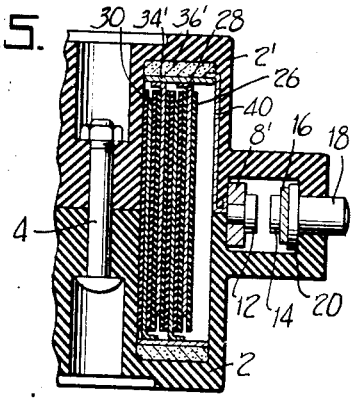
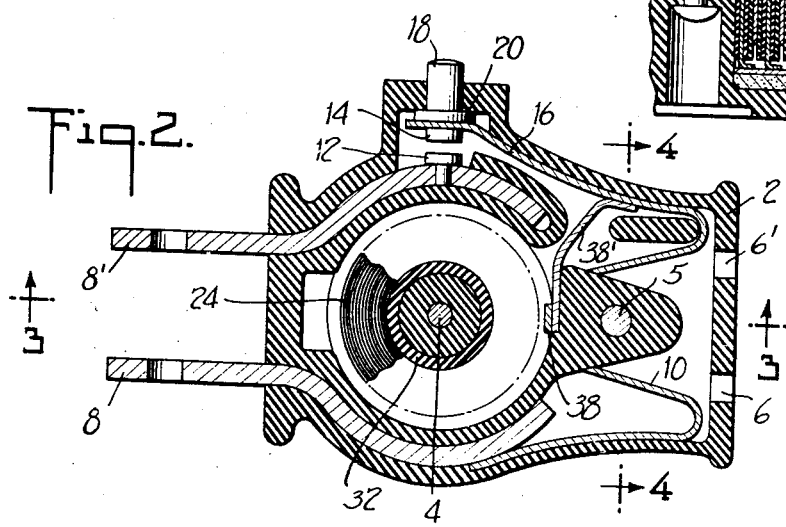
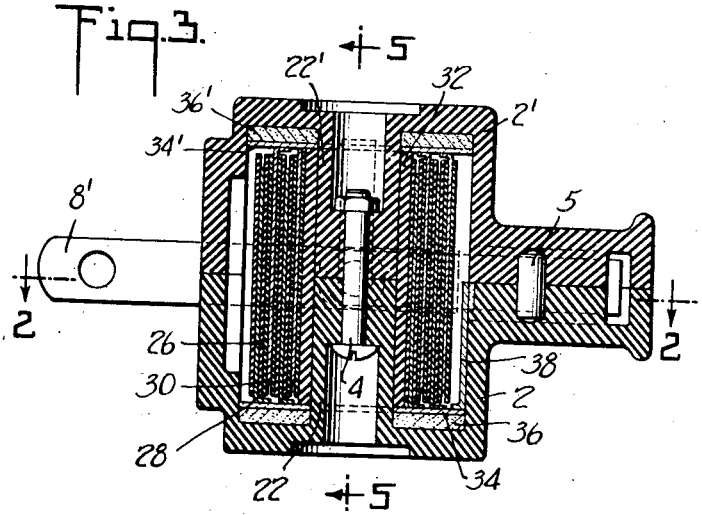
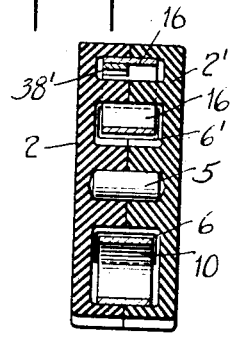
INVENTOR
MILTON E. THOMPSON
BY
Bartlett, Eyre, Scott + Keel
ATTORNEYS Patented Oct. 14, 1941

2,259,359

UNITED STATES PATENT OFFICE 2,259,359

POWER SAVER

Milton E. Thompson, Ridgway, Pa.

Application March 6, 1939, Serial No. 260,115

2 Claims. (Cl. 171—97)

The present invention relates to power saving devices, and comprises a compact unitary device of this character particularly suitable for use with small synchronous motors to reduce the power input to the motor when the motor reaches synchronism.

In my prior Patent #2,040,508 dated May 12, 1936, I have disclosed and claimed various condenser circuits for use with small synchronous motors and have explained the savings obtained when such circuits are employed. In particular, in that patent, I have shown the use of a condenser normally connected in series with the field coil of a motor and a switch for bridging the condenser during starting; the capacity reactance of the condenser being more than twice the inductive reactance of the field winding of the motor. The object of the present invention is to construct a condenser and starting switch of this character as a convenient assembly for insertion directly into a motor circuit.

For a better understanding of the invention reference may be had to the accompanying drawing illustrating the preferred embodiment of the invention.

Fig. 1 is a side view of a power saver, constructed according to the invention and drawn to full scale.

Fig. 2 is an enlarged vertical sectional view of the device of Fig. 1 taken along the line 2—2 of Fig. 3.

Fig. 3 is an enlarged horizontal sectional view taken along the line 3—3 of Fig. 1.

Fig. 4 is a sectional view along the line 4—4 of Fig. 2 and

Fig. 5 is a partial sectional view along the line 5—5 of Fig. 3.

As shown in the drawing, the power saver comprises a casing of molded material such as Bakelite or the like made of two sections 2 and 2' held together by a bolt 4 and kept in alignment by a dowel 5. The casing has a pair of apertures 6 and 6' in one end for reception of standard type prong terminals.

A pair of prongs 8 and 8' extend from the other end of the casing for insertion into the usual type socket. Prong 8 is in electrical engagement within the casing with a conducting spring member 10 positioned to be engaged by a prong inserted through aperture 6 while prong 8' within the casing has a button contact 12 secured thereto. A second button contact 14 is carried by one end of a conducting spring member 16 and normally held thereby out of engagement with contact 12; member 16 extending along the inner side of the casing and having a portion positioned for engagement with a prong inserted through aperture 6'. An operating rod or button 18 slidably mounted in the upper wall of the casing is supported by the end of member 16 carrying contact 14. Thus, when the button 18 is depressed by pressure upon the external end thereof, contacts 12 and 14 are brought into engagement and prong 8' and conducting spring 16 are electrically connected. Upon release of button 18, spring 16 lifts contact 14 out of engagement with contact 12. A shoulder 20 on rod 18 prevents the rod from working out of the casing.

The casing sections are provided with reentrant cylindrical portions 22 and 22' forming a substantially annular chamber within the casing within which is mounted a condenser 24, the construction of which will now be described.

The condenser 24 is made by gluing treated paper ribbon 26, one inch wide and three quarter of one thousandth of an inch in thickness on each side of each of two strips 28 and 30 of aluminum foil ribbon of the same width and thickness as the paper. One edge of foil 28 projects about one tenth of an inch from the edges of paper strips 26 and the other edge of foil 28 is back one tenth of an inch from the other edges of the paper strips. Similarly foil 30 has one edge projecting one tenth of an inch beyond the edges of its paper strips 26 and its other edge back about one tenth of an inch from the other edges of its paper strips. The two foil strips 28 and 30 with their coverings of paper are then wound together on a thin insulating tube 32 with strips 28 projecting at one end of the cylinder and strip 30 projecting at the other end; the edges of paper strips 26 all being in alignment. Strips 28 and 30 are a few inches shorter than the paper strips 26 so that when the winding is completed foils 28 and 30 are completely and thoroughly insulated. The projecting foils are then folded over by a simple spinning process and serve as terminals for the condenser. The completed condenser has an accurate capacity, is of extremely low cost, high quality and great simplicity. In Figs. 3 and 5 the windings of condenser 24 are greatly magnified in order to illustrate the above construction. A thin copper ring 34 held in position by means of a cork ring 36, engages the turned edge of foil 28 and serves as one terminal of the condenser. Similarly a copper ring 34' held against the turned edge of foil 30 by a cork ring 36' serves as the other terminal of the condenser. Narrow copper leads 38 and 38' connect condenser terminal 34 with spring outlet terminal 16 (see Figs. 2 and 3) and a copper lead 40 connects condenser terminal 34' with prong 8' and button contact 12 (see Fig. 5).

When prongs 8 and 8' are inserted into the standard outlet socket for alternating current and the prongs of a plug terminal of the cable of an electric clock are inserted in the openings 6 and 6' to make contact with the spring outlet terminals 10 and 16 repectively, a circuit is established from prong 8 through terminal 10 to the clock motor, and from the motor back through terminal 16 to conductors 38 and 38', condenser terminal 34, the condenser 24, condenser terminal 34' and conductor 40 to prong 8'. With the usual type of small synchronous motor now on the market, the inclusion of the series condenser 24 in this circuit will prevent the motor from starting. If now the button 18 is depressed to close contacts 12 and 14 and to thereby shunt the condenser 24 the motor will start and speed up to synchronism. Button 18 may now be released to reinsert the condenser in the motor circuit. This will reduce the power input to the motor anywhere from 75 to 85 per cent with corresponding saving in cost of power consumed while still supplying to the motor ample power for its needs. The simple compact device illustrated and described can be economically manufactured at the cost of but a small fraction of the savings effected each year by its use with a single clock. The amount of reduction of power input to any given clock will depend, of course, upon the particular motor and the inductance of its field coil and the capacity of the condenser used in the power saver. The smaller the capacity of the condenser, the greater will be its reactance and the greater will be the reduction of power input to the motor and consequently the greater the power saving. In every application of the power saver, in order to reduce the motor input, the capacity reactance of the condenser must be greater than twice the inductive reactance of the motor.

When a power saver of the type above described is used to reduce the power input to non-self-starting, as distinguished from self-starting, synchronous motors, the starting switch of the device may be eliminated, as shunting of the condenser at starting is not then necessary.

In the above description specific dimensions of the condenser are given. These dimensions have been found in practice to yield capacity values suitable for use with most of the small synchronous clock motors now on the market and also with that described in my said Patent #2,040,508 but are given as illustrative only, as obviously other dimensions might be employed.

I claim:
1. A power saver for insertion into a standard outlet socket and for reception of standard prong terminals comprising in combination a casing of insulating material made of two sections which together enclose a substantially annular chamber, a spirally wound condenser within said chamber having a pair of terminals, a pair of prong terminals extending from said casing for insertion into an outlet socket, a pair of spring outlet terminals within said casing, a pair of contacts within the casing, one of said prongs being connected with one of said outlet terminals, the other of said prongs being electrically connected to one of said contacts and to one of said condenser terminals, the other of said spring outlet terminals being connected to the other one of said contacts and to the other one of said condenser terminals, said contacts being normally held out of engagement by that one of said spring outlet terminals connected thereto, and means extending through said casing for closing said contacts to shunt said condenser.

2. A power saver comprising in combination a casing of insulating material provided with reentrant portions forming an annular chamber thereabout and enclosed within the casing, a pair of prong inlet terminals extending from said casing and spaced for insertion into the holes of standard outlet sockets, said inlet terminals extending within said casing on opposite sides of the reentrant portions and externally of said annular chamber, a pair of spring outlet terminals within said casing oppositely disposed with respect to said inlet terminals, one of said outlet terminals rigidly engaging one of said inlet terminals within the casing, the other of said outlet terminals having an inner resilient end extending over the inner end of the other inlet terminal and movable against its own bias into engagement therewith, a spirally wound condenser within said annular chamber having oppositely disposed annular terminals, one of said condenser terminals being electrically connected within said casing to that one of the inlet terminals underlying the movable end of an outlet terminal, and the other of said condenser terminals being electrically connected within said casing to said last mentioned outlet terminal whereby when the movable end of said outlet terminal is moved into engagement with the underlying portion of the inlet terminal the condenser is shunted, and means extending through said casing for moving said resilient end of the outlet terminal into engagement with the underlying inlet terminal.

MILTON E. THOMPSON.